UNITED STATES PATENT OFFICE.

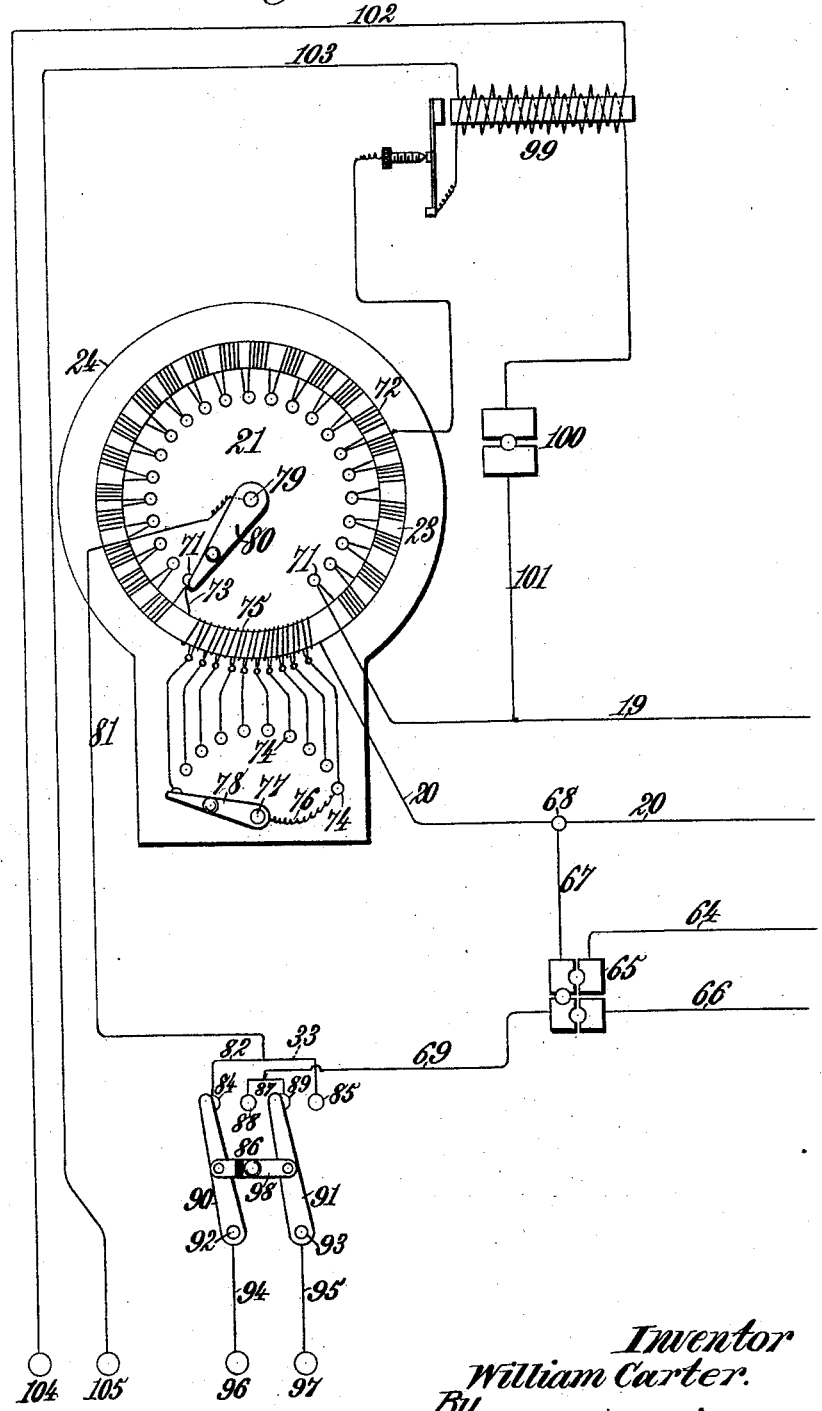

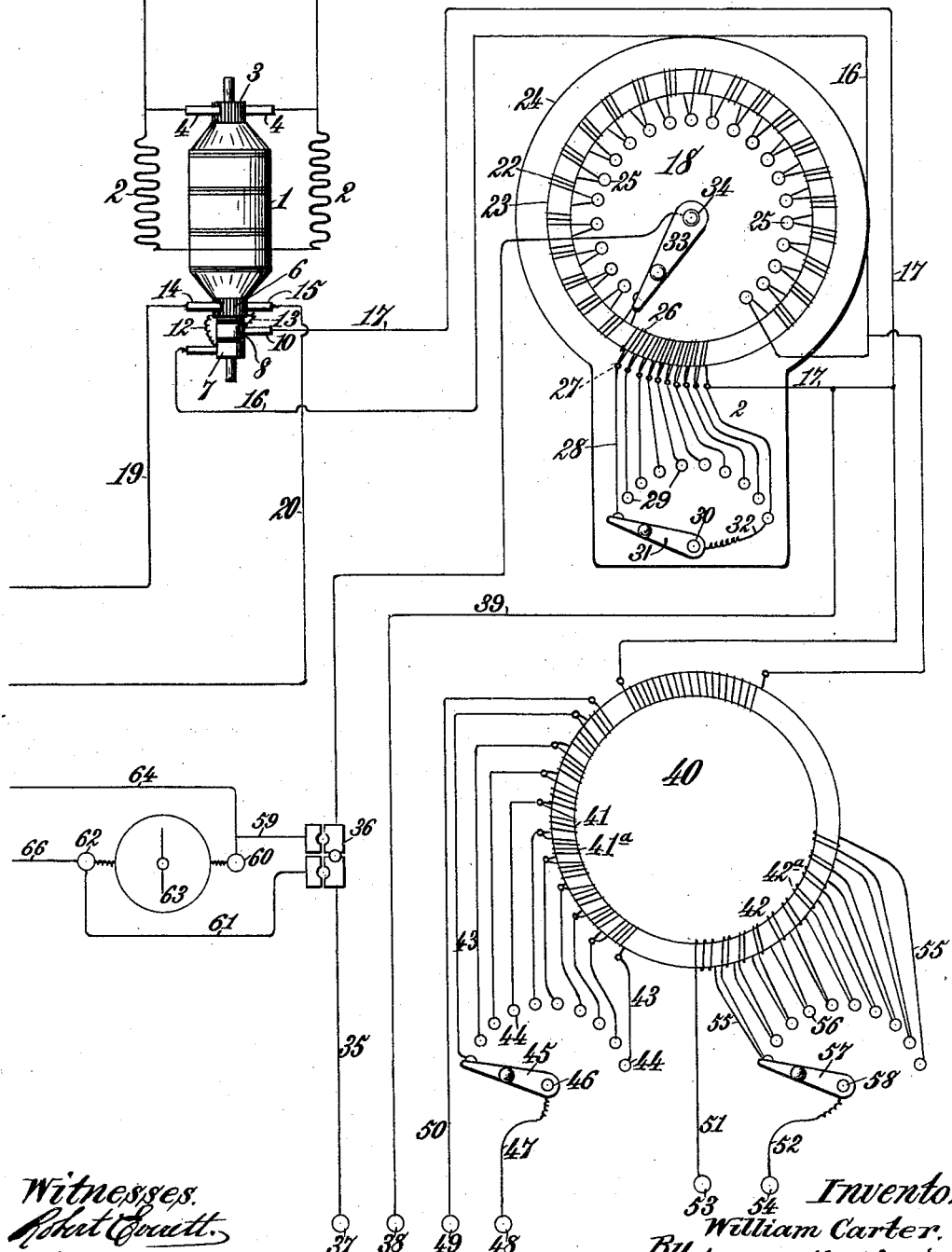

WILLIAM CARTER, OF LOUISVILLE, KENTUCKY.

ELECTROTHERAPEUTIC APPARATUS.

SPECIFICATION forming part of Letters Patent No. 556,617, dated March 17, 1896.

Application filed January 29, 1896. Serial No. 577,277. (No model.)

*To all whom it may concern:*

Be it known that I, WILLIAM CARTER, a citizen of the United States, residing at Louisville, in the county of Jefferson and State of Kentucky, have invented new and useful Improvements in Electrotherapeutic Apparatus, of which the following is a specification.

My invention relates to electrotherapeutic apparatus, my object being to provide a motor-generator capable of being operated by an electric-light or other power circuit and generating a direct and an alternating current simultaneously, provision being made for insuring perfect safety to the patient by preventing the passage of current from the light or power circuit into the generator-circuit.

It is a further purpose of my invention to provide such an electrotherapeutic generator with a switchboard having a simple construction and arrangement whereby the direct and alternating currents may be regulated to any degree required by a large number of relatively-small differentiations and whereby said current may be taken from either pole of the generator and passed from either the direct or the alternating circuit through a millampère-meter or shunted around said meter, as the circumstances of each case may require.

It is my purpose, also, to provide means for converting the direct current into an alternating current and the alternating current into a direct current and to combine with the switchboard suitable connections for various surgical and therapeutic treatment—such as a cautery, a surgeon's exploring-lamp, and other instruments—suitable provision being made for graduating or regulating the current for each, and to enable said instruments to be used either simultaneously or separately.

It is a special purpose of my invention to provide an apparatus of the type named which shall be furnished with current without requiring the use of primary batteries, whereby I avoid the trouble and annoyance caused by the necessity of frequently recharging such batteries and providing new elements, as well as the dirt, slop, and offensive odors which are often given off, and obtain currents which are practically constant, in place of the unavoidable variations of current supplied by either primary or storage batteries.

My invention also includes other novel features, all of which will be fully explained hereinafter and then particularly pointed out and defined in the claims which complete this specification.

To enable those skilled in the art to which my invention pertains to fully understand and practice the same, I will now proceed to describe said invention in detail, reference being had for this purpose to the accompanying drawings, in which—

Figures 1 and 1$^a$ constitute a diagram of a switchboard, showing the arrangement of circuits for both the direct and alternating currents, the generator, regulators, switches, transformers, and millampère-meter, and the several parts of the entire apparatus.

The reference-numeral 1 in said drawings indicates the armature, and the numeral 2 denotes the field-coils of a motor-generator of any suitable type, the motor-coils of the armature being next to the core and the generator-coils outside, complete and sufficient insulation between these two windings being provided, so that it will be impossible for current to pass from the motor-circuit into the generating-circuit. The motor-coils are connected to the commutator 3, and, through brushes 4 to the field-coils 2 and to the wires 5 of an electric-light or other power circuit with which the motor-coils and field-coils are in multiple arc or parallel, like all shunt-wound motors.

The exterior generator-coils of the armature are connected to an independent commutator 6 on the other end of the shaft to give a direct or continuous current. Upon the same part of the shaft and insulated from the commutator 6 are two electrically-isolated rings 7 and 8, having brushes 9 and 10, respectively. These rings are connected by wires 12 and 13 to opposite segments of the commutator 6, so that an alternating current is taken off by said brushes 9 and 10.

From the brushes last mentioned wires 16 and 17 are led to a regulator 18 upon the switchboard, and from the brushes 14 and 15 wires 19 and 20 lead to an independent but substantially similar regulator 21. Each of these regulators consists of a series of coils 22, each having a suitable resistance—as, for example, two ohms. I have shown in the drawings twenty-three of these coils; but this number, as well as the individual resistance, may be varied to any required degree.

The coils 22 are preferably wound upon a single ring 23, of wood or other suitable material, said ring being mounted upon a base 24. Within and near the ring 23 are a series of contact-posts 25, to the first of which the wire 16 and the first terminal of the first coil 22 are attached. To the second post the second terminal of the first coil and the first terminal of the second coil are fastened, and a similar connection is made to each post in succession until the last is reached. To this post are attached the second terminal of the last coil 22 and the first terminal of a coil 26. This coil, which is shown as one of a series of ten similar coils, is wound upon a separate part of the ring 23 and its second terminal is attached to one of a series of contact-posts 27, exterior to that part of the ring. From each contact-post 27 a wire 28 is taken to one of a series of contacts 29, insulated from each other and arranged in an arc of a circle struck from a center 30, which forms the axis of a switch-arm 31, arranged to sweep over all the contacts and engage electrically with any one of them. From said axis 30 a wire 32 goes to the last contact 29, the circuit being completed by the wire 28 connecting said contact to the last contact-post 27, to which the wire 17 is also attached.

Each of the contact-posts 25 is so constructed that it engages electrically with a switch-arm 33, mounted on a bearing 34, with which the series of such contacts is concentric, so that said arm may sweep the whole series.

To the bearing 34, which has, like the arm 33, electric conductivity, a wire 35 is attached leading to a plug-switch 36 and thence to a binding-post 37. From a second binding-post 38 a wire 39 is led to the wire 17. The binding-posts 37 and 38 serve to connect a patient in the alternating circuit, and by adjusting the switch-arms 31 and 33 I can make two hundred and thirty different regulations of the current.

In the alternating circuit I connect a transformer 40 in multiple arc with the wires 16 and 17. This transformer has two independent secondary coils 41 and 42, the first having connection by wires 43 with a series of contact-posts 44, which are swept by a switch-arm 45, turning upon a bearing 46. A wire 47 connects said bearing to a binding-post 48, which serves, with a second binding-post 49, to connect a surgical instrument—such, for example, as a cautery. A wire 50 goes from the binding-post 49 to the second terminal of the secondary coil 41, and each of the contact-posts 44 has connection with a separate section $41^a$ of the secondary coil 41. The terminals of the other secondary coil 42 are connected by wires 51 and 52 to binding-posts 53 and 54 to serve as connections for a surgical exploring-lamp. This secondary, like the one already explained, has its separate sections $42^a$ connected by wires 55 to contact-posts 56, which are swept by a switch-arm 57, mounted on a bearing 58, to which the wire 52 is connected.

The plug-switch 36 is of a construction common in switches of this type, one of its separate contacts being connected by wire 35 to the binding-post 37 and the two remaining being connected as follows: one by a wire 59 to a binding-post 60 and the other by a wire 61 to a second binding-post 62. Between these binding-posts 60 and 62 is a millampèremeter 63, also connected to said binding-posts, and these latter are connected by a wire 64 from the post 60 to one contact of a second plug-switch 65 and the binding-post 62 is connected by a wire 66 to a second contact of said switch. The remaining contacts of said switch are connected one by a wire 67 to a binding-post 68 and the other by a wire 69 to a pole-changing switch described hereinafter.

The circuit for the direct current is by the wire 19 to the regulator 21, the wire being attached to the first of a series of contact-posts 71 within the ring of the regulator. These posts are connections for a series of resistances 72 of about two ohms each, like those in the regulator 18. From the last contact-post 71 a wire 73 goes to the first of a series of contact-posts 74, which form connections for the terminals of a second series of resistances 75, each having about two-tenths the resistance of one of the coils 72. The wire 20, which leads from the brush 15, is connected to the second terminal of the last coil, and from the last contact-post 74 a wire 76 goes to a bearing 77, on which is mounted a switch-arm 78. All the parts comprised in the regulator 21 are duplicates of those in the regulator 18, and therefore need no further description.

From the central bearing 79 for the switch-arm 80 a wire 81 is taken to split terminals 82 and 83 and by the latter connected to the contacts 84 and 85 of a pole-changing switch 86. The wire 69 from the plug-switch 65 is led to the spread-terminal 87, which connects the two remaining contacts 88 and 89 of the pole-changer. Two switch-arms 90 and 91 are pivotally mounted on posts 92 and 93, to which wires 94 and 95 are connected, leading to binding-posts 96 and 97, these posts enabling a patient to be connected in shunt to the regulator 21. The switch-arms are connected by an arm 98, which preserves their parallelism.

In the direct circuit I include a faradic coil 99, having the two terminals of its primary connected to a plug-switch 100 and to the regulator 21, a sufficient number of the coils 72 being included to secure enough voltage to energize the primary of said faradic coil. From the plug-switch 100 a wire 101 goes to the wire 19. The secondary of the faradic coil is connected by wires 102 and 103 to binding-posts 104 and 105, to which the patient is connected through any instruments required.

It is evident, through the plug-switches 36 and 65, the millampère-meter 63 may be connected up in either the direct or the alternating circuit, or said meter can be short-circuited altogether.

By moving the switch-arm of either regulator to the right the strength of current in the patient's circuit will increase, since the movement of the switch increases the number of coils bridged by the patient, the increase being that which corresponds to the number of coils bridged multiplied by the resistance in ohms of one coil. So also the ten small coils are cut out or short-circuited by the switch-arm 78, and the current-strength varied by one-tenth of an ohm for each of the said small coils.

Evidently I could use a single regulator and a single secondary coil in the transformer 40 for both the exploring-lamp and the cautery, but I regard two as being preferable, as it is frequently desirable to use the lamp and the cautery at the same time.

The resistance-series of twenty-three coils in either or both regulators 18 and 21, as well as the lesser series of ten coils, may be varied as to the number of coils, as well as in the degree of resistance offered by each coil.

What I claim is—

1. The combination with a motor-generator having its motor-coils connected to a dynamic circuit, of an electrotherapeutic apparatus comprising two separate circuits, one connected through a commutator and brushes to the generating-coils to take off a direct current and the other connected through two rings to opposite points on said commutator to take off an alternating current, a regulator in each circuit having two, separately-controlled series of resistances, differentiated from, but connected to, each other, a switch-arm in each series, and a patient's circuit in shunt to each regulator, substantially as described.

2. The combination with a motor-generator, or rotary transformer, having its motor-coils connected in a dynamic circuit, of an electrotherapeutic apparatus, comprising two separate circuits, one connected through a commutator and brushes to the generating-coils to take off a direct current and the other connected through two rings to diametrically opposite points on the said commutator to take off an alternating current, a regulator in each circuit having two separately-controlled series of resistances connected to each other, a switch-arm in each series, a patient's circuit in shunt to each regulator, a transformer in the alternating circuit having two secondaries, a circuit from one secondary for an exploring-lamp, and a circuit from the other secondary for a cautery, substantially as described.

3. An electrotherapeutic apparatus, comprising a motor-generator, a circuit for a direct and a circuit for an alternating current, a regulator in each circuit consisting of a series of resistances, a switch-arm to cut the same in and out, and a lesser series of resistances differentiated from but connected with the first, a switch-arm to cut the same in and out of circuit, and a patient's circuit in shunt to the regulator, substantially as described.

4. An electrotherapeutic apparatus comprising a motor-generator, two independent circuits, one for a direct and one for an alternating current, a regulator in each circuit, a patient's circuit in shunt from the regulator, a transformer in the alternating circuit having two secondaries, one connected up for a cautery and the other for a surgical exploring-lamp, a millampère-meter connected through plug-switches to both the direct and alternating circuits, and a shunt from each plug-switch around the millampère-meter, substantially as described.

5. An electrotherapeutic apparatus, comprising a motor-generator, the motor being connected in parallel to an electric-light or power circuit, two independent circuits, one for an alternating current, a regulator for each circuit, a patient's circuit in shunt to each regulator, a millampère-meter connected through plug-switches to both circuits, a shunt from each plug-switch around the millampère-meter, a transformer in the alternating circuit having two secondaries, a cautery connected up in one secondary circuit, a surgeon's exploring-lamp connected in the other secondary circuit, a faradic coil in shunt from the direct circuit, its primary including part of the coils of the regulator, a patient's circuit connected to the secondary of said coil, a pole-changing switch in the direct circuit and a patient's circuit including the switch-terminals, substantially as described.

In testimony whereof I have hereunto set my hand in presence of two subscribing witnesses.

WILLIAM CARTER.

Witnesses:
E. M. WARD,
ELSA PEKLENK.